June 11, 1963 E. F. MACKS 3,093,382
SEAL
Filed July 10, 1956

INVENTOR.
ELMER FRED MACKS
BY Pyle and Fisher
ATTORNEYS

United States Patent Office 3,093,382
Patented June 11, 1963

3,093,382
SEAL
Elmer Fred Macks, Willow Lane, Vermilion, Ohio
Filed July 10, 1956, Ser. No. 597,039
6 Claims. (Cl. 277—27)

This invention pertains to fluid seals and more particularly to a seal for retaining fluid under pressure in a chamber having a wall with a shaft projecting through it.

Recently many devices have come into use which require shaft seals capable of retaining fluids under extremely high pressure, temperature and/or speed conditions. Prior known seals adapted for these extreme conditions have generally had a very short life span and/or a very high leakage rate.

One of the principal objects of this invention is to provide a shaft seal capable of limiting leakage of fluid under extremes of temperature, pressure, and/or speed.

It has been discovered that a foraminous body may be employed as a fluid seal. Certain concepts of this discovery have been disclosed in my copending application for patent filed October 14, 1954 bearing Serial No. 462,195, now Patent No. 3,001,806 and under the title "Sealing Member," in United States patent application Serial Number 484,152, now Patent No. 2,964,339 filed January 26, 1955, under the title "Seal," and in a continuation-in-part of this application, Serial Number 643,665, now Patent No. 2,907,594 filed March 4, 1957, under the title "Seal." The body has at least one foraminous or porous surface which is exposed to the quantity of fluid under pressure to be sealed. The fluid under pressure passes through such one surface and through the foraminous body to a second surface. The second surface is a sealing surface which confronts a smooth complemental surface to define a sealing region. The body is movable along a path substantially paralleling the direction of fluid flow which is sought to be prevented. The sealing surface may preferably lie in a plane which is substantially normal to such path.

As fluid flows through the foraminous body to the sealing region there is a pressure drop due to the restricted flow through the body. A film of fluid under pressure is built up in the fluid-film region. Fluid escapes at the peripheral extremities of the fluid-film region. If the pressure tending to move the body toward the complemental surface exceeds the pressure of the fluid-film region, the body will shift toward the complemental surface. This shifting will reduce the flow of escaping fluid and consequently the flow of fluid through the foraminous body. As soon as the flow of fluid through the foraminous body is reduced there is an immediate decrease in the pressure drop and a consequent rise in pressure in the fluid-film sealing region. Thus, the body will be self-adjusting and seek a position where the opposed fluid pressures equalize one another without allowing contact. The operating fluid-film thickness between the relatively moving surfaces may range from 0.000010 to 0.005 inch depending upon the application.

Heretofore, some fluid seals have been employed which are not fully impervious. Examples are carbon seals. These seals, however, are generally filled to be made as impervious as possible, the porosity being in the neighborhood of one-half percent (½%) or less. Such seals are intended to contact a complemental surface and so prevent fluid leakage. In some previous constructions, a very weak fluid-film has been partially maintained between contacting surfaces due to the radial fluid pressure gradient caused by leakage flow. Neither of these prior mechanisms bear on the subject invention. In the present invention porosity is employed in a sealing member (as one form of foramina) to permit fluid flow to a sealing region. In this case the foramina are "pores" which act to internally balance and critically space the relatively moving surfaces so that contact will not occur in spite of pressure variations and misalignment.

A second object of this invention is to provide a foraminous seal in which a feedback of fluid pressure and accompanying variance in pressure drop is utilized to provide a self-balancing seal.

An additional object of this invention is to provide a fluid seal which is movable along the path of fluid escape and which is inherentively self-balancing to provide a sealing film of fluid under pressure which sealing film pressure is self-adjusting to maintain the pressure of chamber fluid under a wide range of chamber pressure conditions.

Another object of this invention is to provide a device in which a foraminous body is employed as a combination thrust bearing and seal. In such a device thrust imposed by the shaft will tend to increase the pressure in the fluid region and thus reduce the flow through the foraminous body. The pressure chamber surface is relatively large, as compared with a device used as a seal alone, to assure a balance of pressures imposed on the end surfaces of the seal.

A further object of this invention is to provide a fluid seal in which the sealing surfaces are not wearing surfaces and therefore the seal has a life of substantially infinite duration.

Another and more detailed object of this invention is to provide a foraminous body in which the foraminous material is a porous material such as a sintered metal.

Yet another object of this invention is to provide a seal in which at least one distribution groove is formed in the foraminous body to facilitate the flow of fluid to the fluid seal region.

Still another and more special object of this invention is to provide a seal in which the foraminous body has fluid passages each having a restricted orifice to provide an orifice compensated seal.

An additional object of this invention is to provide a cartridge unit incorporating an improved seal which unit may be installed between a shaft and a housing to form a fluid seal.

Other objects and a fuller understanding of the invention may be had by referring to the following description and claims, taken in conjunction with the accompanying drawings, in which:

Figure 1:
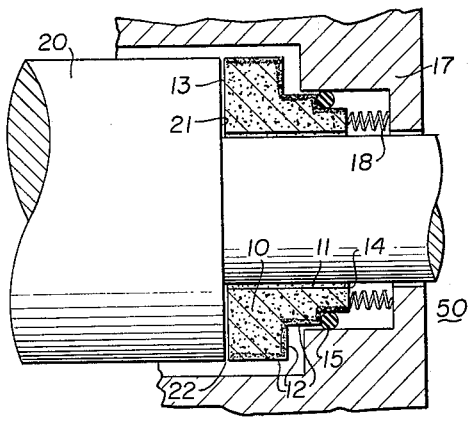
FIGURE 1 is a fragmentary sectional view showing a fluid seal made in accordance with the present invention.

Referring to the drawing, and to FIGURE 1 in particular, a permeable body is shown at 10. The disclosed body is annular in form and is disposed about shaft 20. The body 10 has outer surfaces 11, 12 which define the radial extremities of the body. The body also has end surfaces 13, 14 which define axial extremities.

A chamber in which fluid under pressure is to be sealed is indicated by the numeral 50 throughout the drawings.

In FIGURE 1 the innermost surface 11 of the outer surfaces 11, 12 is in communication with the chamber 50. The end surface 14 is also in communication with the chamber 50. The other of the outer surfaces, in this case the outermost surface 12, is an impervious surface through which fluid cannot flow. The impervious layer is shown having an exaggerated thickness for clarity of illustration. The layer may be formed by burnishing or painting the surface 12 or any other technique which will provide an impervious surface. The pressure chamber surfaces 11, 14 have open pores and therefore may be referred to as open surfaces.

The surface 13 is a sealing surface which opposes a complemental surface 21. A sealing fluid film region 22 is defined by the complemental surfaces 13, 21. The sealing surface 13, like the open surfaces 11, 14, has open pores. Thus, fluid under pressure may pass from the pressure chamber 50 through the walls 11, 14, thence through the foraminous body 10 and out through the sealing surface 13 into the fluid region 22. Since the outermost surface 12 is impervious, fluid may not escape from the body through that surface.

A sealing gasket 15, such as an O-ring, is interposed between the surface 12 and housing 17 to prevent leakage between the body 10 and the housing 17. The body 10 and the housing 17 are relatively movable along a path paralleling the axis of the shaft 20.

When the device is in operation fluid in the pressure chamber 50 exerts a pressure against the end surface 14 tending to shift the body 10 axially to the left as viewed in FIGURE 1. The fluid pressure in the sealing region 22 resists this leftward axial movement and tends to shift the body to the right as seen in FIGURE 1. Since there will always be some pressure drop as fluid flows from the chamber 50 through the body 10 to the region 22 the pressure in the region 22 will always be somewhat less than the pressure in the chamber 50. To provide a body which will assume a balanced position with the complemental surfaces 13, 21 out of contact, the sealing surface 13 has, in the absence of other thrust loads, an area which is greater than the area of the opposite end surface 14 which includes the projected area of the O-ring exposed to the pressure in chamber 50. Thus, the exposed areas at opposite ends of the body 10 are such that pressure times area at one end will be self-adjusting to equal pressure times area at the other.

A spring 18 may be interposed between the body 10 and the housing 17. The spring may be under either tension or compression depending upon the reason for its installation. If the spring is under tension it will hold the surfaces 13, 21 out of contact and in spaced relationship until substantial fluid pressure is built up in the chamber 50. If it is desired to substantially prevent fluid leakage when the device is at rest or first placed in operation, the spring 18 may be under compression to force the surfaces 13, 21 into contact. The surfaces 13, 21 will remain in contact until sufficient pressure is developed in the chamber 50 to pass through the body 10 and create a fluid film in the region 22. Thus if one wishes to minimize fluid leakage from the outset the spring is placed in compression. If one wishes to minimize wear of the complemental surfaces 13, 21, the spring is placed in tension. A certain amount of flexibility is provided by the gasket 15 so that the sealing surface 13 and the complemental surface 21 may self-adjust so as to be parallel in spite of misalignment or deflection or warpage under extreme temperature conditions.

Figure 2:
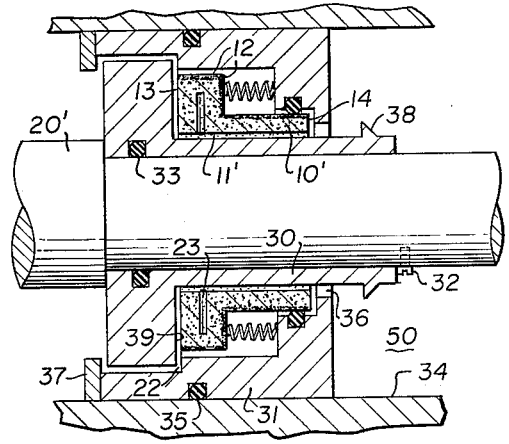
FIGURE 2 is a fragmentary sectional view showing a cartridge unit employed as a fluid seal and showing a foraminous body in which distribution grooves or holes have been formed.

In FIGURE 2 a cartridge unit is disclosed. The cartridge has an inner ring 30 and an outer ring 31. The inner ring 30 is suitably fixed to the shaft to assure rotation of the inner ring 30 with the shaft 20'. A gasket such as O-ring 33 may be interposed between the ring 30 and shaft 20' to prevent fluid leakage therebetween. The outer ring 31 is a slip or press fit in housing 34 and may be keyed or held to prevent rotational or axial creep.

A suitable gasket such as O-ring 35 may be interposed between the outer ring 31 and the housing 34. An end closure 37 is fixed to the outer ring 31 to hold the cartridge unit together.

When the device is in operation fluid under pressure passes from the chamber 50 through annular opening 36. The annular opening 36 is between the inner and outer rings 30, 31. To prevent the passage of dirt from the chamber 50 to the annular opening 36 an annular projection 38, which is known as a slinger, is provided on the inner ring 30. Fluid cannot pass along an axial path from the chamber 50 into the opening 36. Fluid must flow over the slinger 38. This flow tends to permit the inertia of dirt particles to carry them radially outwardly rather than through the opening 36.

In FIGURE 2 the foraminous body 10' has a slightly modified form of construction. The innermost surface 11' is, like in FIGURE 1, the open surface. The innermost surface 11' has an opening therein and a fluid dispersion region defined by a distribution passage 23 communicating with it. The distribution passage 23 may take the form of an annular ring or a plurality of segments of such a ring. A plurality of drilled holes may be formed, for example, to serve as distribution passages 23. The distribution passages may parallel the sealing surface 13 or may be inclined thereto.

In the embodiment of FIGURE 2 a complemental surface 39 is provided on the inner ring 30. The complemental surface 39 corresponds in shape and function to the complemental surface 21 of FIGURE 1.

Figure 3:
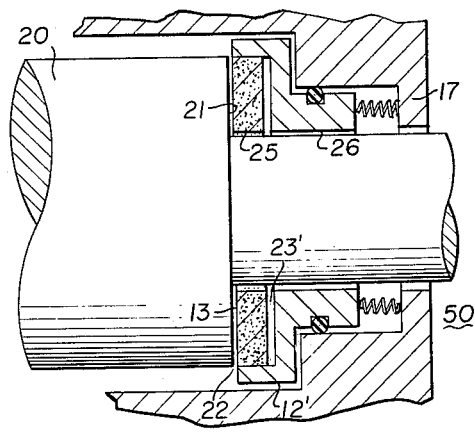
FIGURE 3 shows a modified form of fluid seal in which the seal has a foraminous section and a solid section.

In FIGURE 3 a slightly modified form of seal is shown. Here the body is comprised of a foraminous section and a solid section 26. The foraminous section 25 may be annular in form. A distribution region 23' is defined by spacing of the foraminous section 25 and the solid section 26. The outermost surface 12' of the solid section 26 extends peripherally about the foraminous section 25. Thus, the outermost surface 12' corresponds in shape and function to the outermost surface 12 of FIGURE 1.

Figure 4:
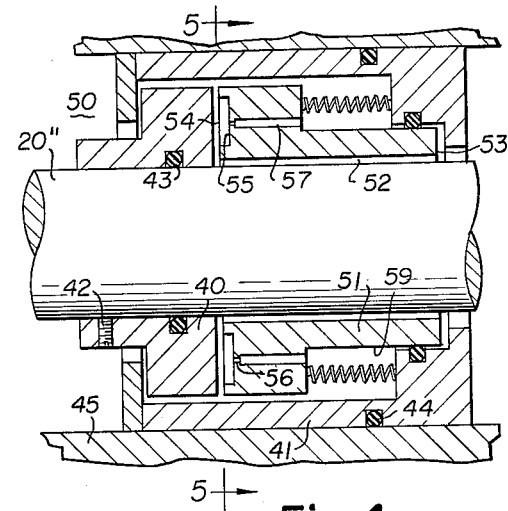
FIGURE 4 shows yet another cartridge form of fluid seal having orifice compensation.
Figure 5:
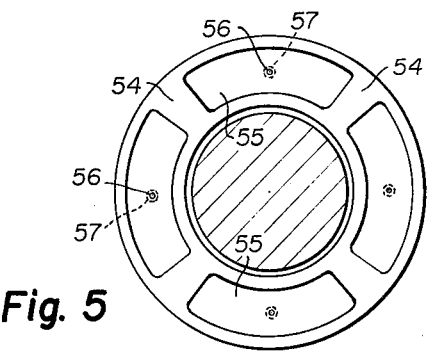
FIGURE 5 is a front elevational view of the orifice compensated sealing surface of the device of FIGURE 4.

In FIGURES 4 and 5, another form of cartridge bearing is disclosed. Here inner and outer rings 40, 41 are provided. The inner ring 40 is of substantially less axial dimension than the outer ring 41. The inner ring 40 is fixed to the shaft 20'' as by set screw 42. An O-ring or other gasket 43 may be interposed between the ring 40 and the shaft 20''. A gasket 44 may be interposed between the outer ring 41 and the housing 45. Additionally, the outer ring 41 may be fixed to the housing 45 to prevent circumferential or axial creep.

In the previously disclosed embodiments the seal body 10 has been shown as formed of sintered or other porous materials. In the embodiment of FIGURES 4 and 5 the foraminous body indicated at 51 is formed of a solid material. The body has an innermost outer surface 52 and an end surface 53. The body 51 also has an outermost outer surface 59 which like the surface 12 is stepped. In the drawing a passageway 57 is formed in the body. This passageway communicates with the chamber 50 through the surface 57 which is the open surface in this embodiment. Thus in this embodiment leakage is radially inwardly rather than outwardly as previously shown.

The body 51 has a second end surface 54 which is the sealing surface. The sealing surface 54 has a plurality of recesses 55 formed therein. The passages 57 communicate with the recesses 55. A flow restricting orifice 56 is provided before each of the recesses 55. The orifice 56 restricts the flow of fluid from the chamber 50 to the recesses 55 and thereby assures a fluid pressure drop which will vary with the rate of fluid flow. The functioning of the device of FIGURE 4 is identical in all other ways to the previously disclosed embodiment. The recesses are shallow pockets of from about 0.0001 to about one-sixteenth inch in depth, depending upon the operating conditions. Fluid under pressure will build up in each of these regions. When gas is the fluid being sealed the recesses should be as shallow as possible so as to prevent self-induced vibration and also to minimize compressibility effects. The number of recesses may vary. Three or more recesses each supplied by a separate orifice restriction are preferred in order to automatically compensate for misalignment distortion.

The seal principles employed herein may of course be utilized with two or three seals in series such as those described in my co-pending application bearing Serial No. 484,152, now Patent No. 2,964,339 and by further co-pending application for patent entitled Sealing Member filed October 14, 1954 and bearing Serial No. 462,195, now Patent No. 3,001,806, entitled "Seal" and filed January 26, 1955.

One of the outstanding advantages of this discovery is the employment of a body as a combination fluid seal and thrust bearing. Each of the above disclosed embodiments may be used in this dual function. However, in FIGURE 6 a combined thrust bearing is shown specifically to clearly spell out this feature.

An orifice compensated body 51' is disclosed. Other foraminous bodies such as the porous body 10 of FIGURE 1 may be used. The body 51 is fixed to the housing 17. A peripheral seal is formed at 61. The recessed surface 54 confronts the complemental surface 21. Fluid under pressure passes from the chamber 50 through the passage 57' and the orifice 56 to form a film of fluid under pressure between the surfaces 54, 21. This film serves the dual function of forming a fluid seal and a thrust load absorbing film.

Figure 6:
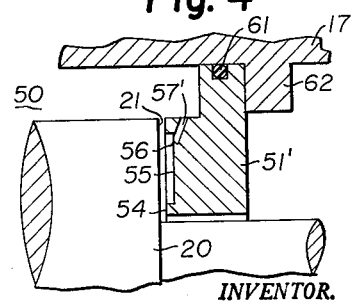
FIGURE 6 is a fragmentary sectional view of a combination fluid seal and thrust bearing embodying the principles of this invention.

While in the embodiment of FIGURE 6 the body 51' is axially fixed against housing shoulder 62, the axially movable bodies of the previously disclosed embodiments may be employed as a combination seal and thrust bearing. In FIGURE 1, for example, the pressure in the region 22 times the cross-sectional area of that region will equal the pressure in chamber 50 times the area of the surface 14 and the O-ring 15 when a balanced condition is achieved. If the device is to be used as a combination thrust bearing seal the thrust load of the shaft 20 is taken into account in determining the relative sizes of the surfaces 13, 14.

There has thus been described a fluid seal device which can be made to be self-adjusting and regulating so that no contact occurs over a very wide range of pressures, speeds, and temperatures.

Although the invention has been described in its preferred form with a certain degree of particularity it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a housing defining at least a portion of a pressure chamber and having an aperture therein, a shaft projecting through said aperture and having a radially directed shoulder near said aperture, a sealing ring around the shaft and interposed between the housing and the shoulder, said ring extending from a first transverse end wall remote from said shoulder to a sealing face adjacent said shoulder, said ring including a cylindrically contoured portion extending from said first end wall to a second transverse end wall intermediate the ends of the ring, said ring including an outwardly directed flange adjacent said sealing face and of a diameter greater than said cylindriral portion, the housing including a cylindrical portion spaced from and concentric to the ring cylindrical portion, one of said cylindrical portions having an annular groove formed therein, an O-ring in the groove and in sliding engagement with said other cylindrical surface to seal said chamber and prevent the flow of fluid between the housing and the ring, a spring interposed between the housing and the ring and biasing the ring toward said shoulder, said shoulder having a sealing face complemental to the ring sealing face and defining a fluid film producing region therebetween, said ring having sealing fluid supply passages extending from the face through the ring and communicating with said chamber to conduct a quantity of the fluid being sealed from the chamber to the fluid film producing region, one of said transverse end walls being in said chamber and of an area less than the area of said ring sealing face to cause the pressure in the chamber to urge the ring toward the shoulder with a pressure less than the pressure of a generated film urging the ring away from the shoulder when the device is in use, and the radial extremity of said region remote from said chamber being in unobstructed communication with the atmosphere ambient to the housing whereby fluid may escape continuously from the region to the ambient atmosphere.

2. The device of claim 1 wherein said spring is interposed between said one transverse end wall and the housing.

3. The device of claim 1 wherein said passages are orifice compensated.

4. The device of claim 1 in which said ring has a distribution passage therein which is substantially annular in shape.

5. The device of claim 1, in which said ring is formed of foraminous material having a plurality of restricting fluid passages therein, the cylindrically contoured portion and the outwardly directed flange portion of said ring being impervious to said fluid.

6. The device of claim 1 in which said first transverse end wall portion of said ring is of solid construction and is impervious to said fluid and said sealing face is of foraminous material having a plurality of restricting fluid passages therein, said foraminous material being in communication with the fluid in said chamber.

References Cited in the file of this patent

UNITED STATES PATENTS

| 1,315,822 | Doran | Sept. 9, 1919 |
| 1,876,515 | Emmet | Sept. 6, 1932 |
| 2,033,403 | Smittle | Mar. 10, 1936 |
| 2,036,308 | Vroom | Apr. 7, 1936 |
| 2,075,444 | Koehring | Mar. 30, 1937 |
| 2,279,669 | Friskney | Apr. 14, 1942 |
| 2,554,488 | Carr | May 29, 1951 |
| 2,555,492 | Kidney | June 5, 1951 |
| 2,706,652 | Berger | Apr. 19, 1955 |
| 2,779,611 | Wernert | Jan. 29, 1957 |
| 2,835,514 | McGahan | May 20, 1958 |

FOREIGN PATENTS

| 151,917 | Australia | June 16, 1953 |